(12) United States Patent
Ohtsuka (10) Patent No.: US 6,354,981 B1
(45) Date of Patent: Mar. 12, 2002

(54) CONTROLLING APPARATUS FOR SYNCHRONOUS ENGAGEMENT TYPE AUTOMATIC TRANSMISSION

(75) Inventor: Toshio Ohtsuka, Hyogo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/576,198

(22) Filed: May 23, 2000

(30) Foreign Application Priority Data

Jan. 11, 2000 (JP) ........................................ 2000-002552

(51) Int. Cl.$^7$ .............................................. F16H 59/74
(52) U.S. Cl. .......................................................... 477/99
(58) Field of Search ................................ 477/115, 116, 477/120, 121, 123, 124, 99; 74/335, 336 R (56) References Cited

U.S. PATENT DOCUMENTS

| | | | |
|---|---|---|---|
| 5,385,515 A | * | 1/1995 | Chan et al. ................... 477/75 |
| 5,498,216 A | * | 3/1996 | Bitsche et al. ................ 477/20 |
| 5,729,454 A | * | 3/1998 | Amsallen .................. 384/424.08 |
| 5,761,628 A | * | 6/1998 | Steeby et al. .................. 701/64 |

FOREIGN PATENT DOCUMENTS

JP          63-270252          11/1988          .......... B60K/41/01

* cited by examiner

Primary Examiner—Dirk Wright
(74) Attorney, Agent, or Firm—Sughrue Mion, PLLC (57) ABSTRACT

Gears in a synchronous engagement type transmission are shifted through positional control by a shift/select actuator to thereby automate speed change. A controlling apparatus for a synchronous engagement type transmission includes a shift/select actuator for switching a plurality of gear stages of a synchronous engagement type automatic transmission, a shift position sensor for detecting a shift position of the automatic transmission, a select position sensor for detecting a select position of the automatic transmission, an engine rpm sensor for detecting an rpm of an engine, and a control unit for controlling the shift/select actuator on the basis of the sensor outputs of these sensors. In the case where the shift position and the select position are not in a neutral position when a key switch is turned on, the shift/select actuator is controlled to return the shift position and the select position back to the neutral position.

8 Claims, 6 Drawing Sheets

CONTROLLING APPARATUS FOR SYNCHRONOUS ENGAGEMENT TYPE AUTOMATIC TRANSMISSION

BACKGROUND OF THE INVENTION

1. Field of the Invention

The present invention relates to a controlling apparatus for a synchronous engagement type automatic transmission, and more particularly to a controlling apparatus for a synchronous engagement type automatic transmission with which gears in the synchronous engagement type transmission are shifted through positional control by a shift select actuator to thereby automate speed change.

2. Description of the Related Art

An example of a conventional controlling method for a synchronous engagement type automatic transmission is disclosed in Japanese Patent Application Laid-Open No. Sho 63-270252. In this conventional controlling method, a drive force of an engine is inputted into a synchronous engagement type automatic transmission by an ON/OFF operation of an electromagnetic clutch, a three-position hydraulic cylinder for selection is driven by the operational combination of a pair of hydraulic electromagnetic valves to select the speed gears, and a three-position hydraulic cylinder for shift is driven by the operational combination of a pair of hydraulic electromagnetic valves, thereby shifting the speed gear stages for changing speed.

Also, there is a synchronous engagement type automatic transmission in which, upon speed change, gear stages are shifted by two motors, i.e., a shift motor and a select motor instead of the operational combination of a pair of hydraulic electromagnetic valves.

However, in the case where the shift/select position is not in a neutral position when a key switch is turned on, the above-described conventional controlling method for the synchronous engagement type automatic transmission suffers that the vehicle starts forward or backward if the engine is started without taking preventive measures.

Also, in the conventional controlling method for the synchronous engagement type automatic transmission, in the case where the shift/select position is not in the neutral position upon the turn-on of the key switch after the battery has been turned off, there is a problem in that, if a learning operation is effected using that position as reference, the shift neutral position learning and the shift completion position learning could not be performed normally.

SUMMARY OF THE INVENTION

The present invention has been made to solve the above problem inherent in the prior art, and an object of the present invention is therefore to provide a controlling apparatus for a synchronous engagement type automatic transmission with which gears in a synchronous engagement type transmission are shifted through positional control by a shift/select actuator to thereby automate speed change, solving the problem of returning the gear to the neutral position when a key switch is turned on, and improving accuracy in shift neutral position learning and shift completion position learning upon the turn-on of the key switch after the battery has been turned off.

According to a first aspect of the present invention, there is provided a controlling apparatus for a synchronous engagement type automatic transmission that automatically shifts plural gear stages of a synchronous engagement type staged transmission, the controlling apparatus comprising: a shift/select actuator for shifting the gear stages; a first detecting means for detecting a shift position of the automatic transmission; a second detecting means for detecting a select position of the automatic transmission; a third detecting means for detecting an rpm of an engine; and a control means for controlling the shift/select actuator on the basis of detection outputs of the first to third detecting means, in which, if the shift position and the select position are not in the neutral position when a key switch is turned on, the shift/select actuator is controlled to return the shift position and the select position to the neutral position.

According to a second aspect of the invention, in the controlling apparatus for a synchronous engagement type automatic transmission of the first aspect of the invention, the neutral position return is performed before a shift neutral position learning and a shift completion position learning upon turn-on of the key switch after the battery has been removed.

According to a third aspect of the invention, in the controlling apparatus for a synchronous engagement type automatic transmission of the first aspect of the invention, the neutral position return is performed when the engine is stalled.

According to a fourth aspect of the present invention, there is provided a controlling apparatus for a synchronous engagement type automatic transmission that automatically shifts plural gear stages of a synchronous engagement type staged transmission, the controlling apparatus comprising: a shift/select actuator for shifting the gear stages; a first detecting means for detecting a shift position of the automatic transmission; a second detecting means for detecting a select position of the automatic transmission; and a control means for controlling the shift/select actuator on the basis of detection outputs of the first and second detecting means, in which the shift/select actuator is controlled to return the shift position and the select position to a neutral position while a key switch is turned off.

DESCRIPTION OF THE PREFERRED EMBODIMENTS

Embodiments of the present invention will now be described with reference to the accompanying drawings.

Embodiment 1

Figure 1:
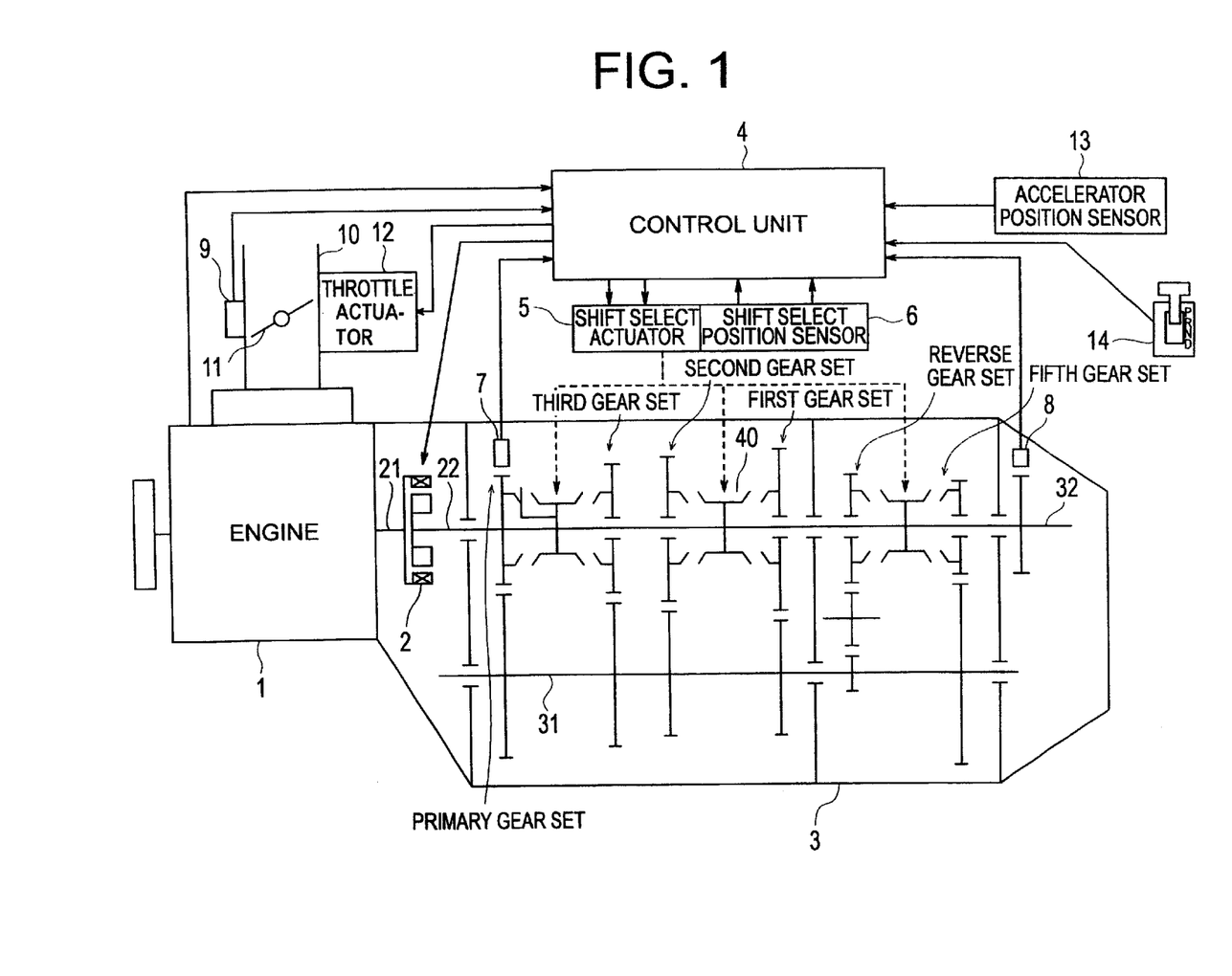
FIG. 1 is a structural view showing an embodiment 1 of the invention.

FIG. 1 is a view showing the structure of a controlling apparatus for a synchronous engagement type automatic transmission in accordance with an embodiment 1 of the present invention.

In FIG. 1, reference numeral 1 denotes an engine, numeral 2 denotes an electromagnetic clutch, numeral 3 denotes a synchronous engagement type automatic transmission and numeral 4 denotes a control unit as a controlling means.

A throttle valve 11 is provided in an intake pipe 10 of the engine 1, a throttle opening degree position is detected by a throttle positional sensor 9, an output signal of an accelerator positional sensor 13 in proportion to a step-on amount of an accelerator pedal (not shown) by a driver is signal-processed in the control unit 4, and a feedback control is performed through a throttle actuator 12 to obtain a target throttle opening degree position in accordance with the step-on amount of the accelerator. Also, an engine rpm is detected by an engine rpm sensor 15 as a third detecting means to be fed to the control unit 4.

The electromagnetic clutch 2 is controlled by a clutch exciting current in proportion to the clutch transmission torque by the control unit 4 with respect to transmission/interruption of the power from a crankshaft 21 of the engine 1 to an input shaft 22 of the synchronous engagement type automatic transmission 3.

The synchronous engagement type automatic transmission 3 is a counter shaft type five-stage gear transmission having, for example, five pairs of forward speed gears different in gear ratio, a pair of backward speed gears and three sleeve gears 40 for switching engagement of the speed gears. The input rotation is first transmitted to a counter shaft 31 by a primary gear that is located in the frontmost position on an input shaft 22. An output shaft 32 extends to the three-gear set. The transmission path/speed change ratio (gear ratio of the primary gear × gear ratio of each speed gear) is changed depending upon which one should be selected out of these gears.

At the forth speed, the input shaft 22 and the output shaft 32 are connected directly with each other. This synchronous engagement type automatic transmission 3 changes speed through a release operation and a coupling operation. In the release operation, the shift control of the sleeve gears 40 is made by the shift/select actuator 5 for shifting gears, which is controlled by an output signal of the control unit 4, to release a mechanical engagement of the gears of the current gear shift stages, and in the coupling operation, of the gears of the next gear shift stage are mechanically engaged.

The control unit 4 receives a sift lever positional signal for outputting a switch signal in accordance with the position of the shift lever 14 operated by the driver, an acceleration position sensor 13 signal representative of the step-on amount of the acceleration pedal (not shown) and an output of a transmission output shaft rpm sensor 8 for detecting the rpm of the transmission output shaft 32, determines a gear shift stage that is suitable for the vehicle traveling condition by the transmission shift pattern (not show), and outputs the control signal to the shift/select actuator 5 while detecting the shift/select position by the shift/select position sensor so that the shift of the sleeve gear 40 is controlled. The speed is changed by the release operation for releasing the mechanical engagement of the gears of the current gear shift stage and by the coupling operation for mechanically engaging the gears of the target gear shift stage.

The synchronous condition of the sleeve gears 40 is detected from the transmission input/output shaft rpm relationship detected by the transmission input shaft rpm sensor 7 and the transmission output shaft rotation sensor 8. During the gear shift, the throttle valve 11 is throttled to a predetermined opening position by the throttle actuator 12 and the exciting current of the electromagnetic clutch 2 is turned off to bring the synchronous engagement type transmission into a power-off condition to thereby switch the gear shift stages.

Figure 2:
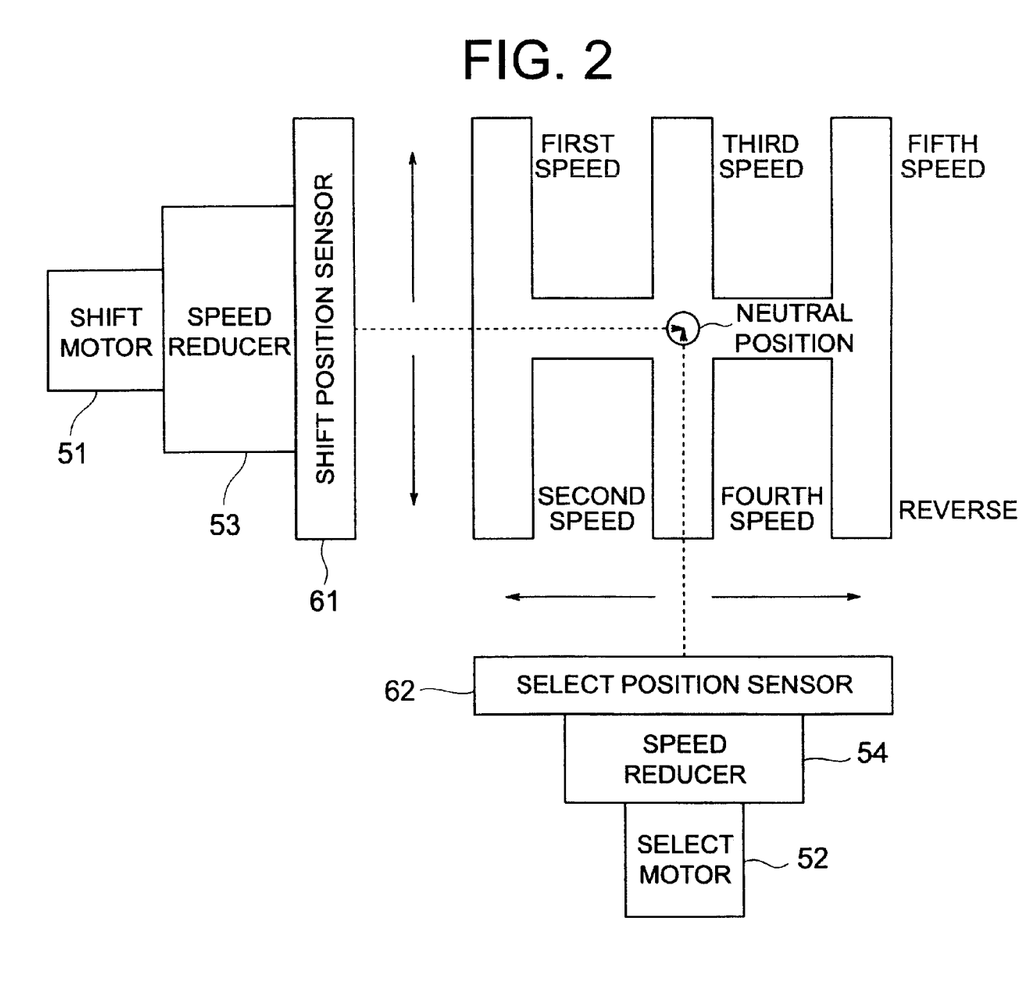
FIG. 2 is a structural view showing an example of a shift/select actuator and a shift/select position sensor according to the embodiment 1 of the invention.

FIG. 2 is a view showing the structure of the shift select actuator 5 and the shift select positional sensor 6 shown in FIG. 1.

The shift control of the control unit 4 includes the shift drive through a speed reducer 53 by a shift motor 51 incorporated in the shift select actuator 5, and the feedback control of the shift position by detecting the shift position by a shift positional sensor 61 as a first detecting means.

The select control of the control unit 4 includes the select drive through a speed reducer 54 by a select motor 52 incorporated in the shift select actuator 5, and the feedback control of the select position by detecting the select position by a select positional sensor 62 as a second detecting means.

Figure 3:
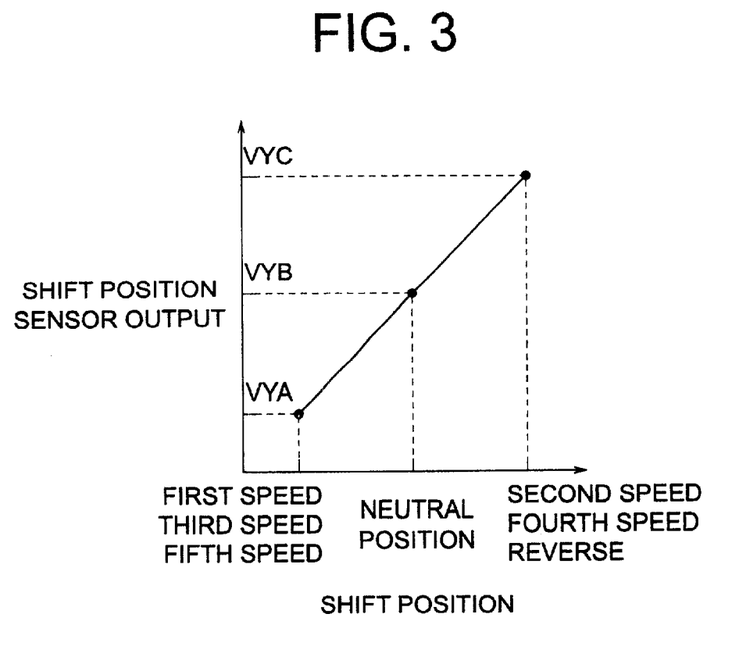
FIG. 3 is a characteristic view showing a relationship between the shift position and the shift position sensor output in accordance with the embodiment 1 of the invention.

FIG. 3 shows the relationship between the above-described shift position and the output of the shift positional sensor 61, in which the values representative of the shift position voltage learning for a first speed, a third speed and a fifth speed are designated by VYA, the values representative of the neutral position voltage learning is designated by VYB and the values representative of the shift position voltage learning for a second speed, a fourth speed and a reverse mode are represented by VYC.

Figure 4:
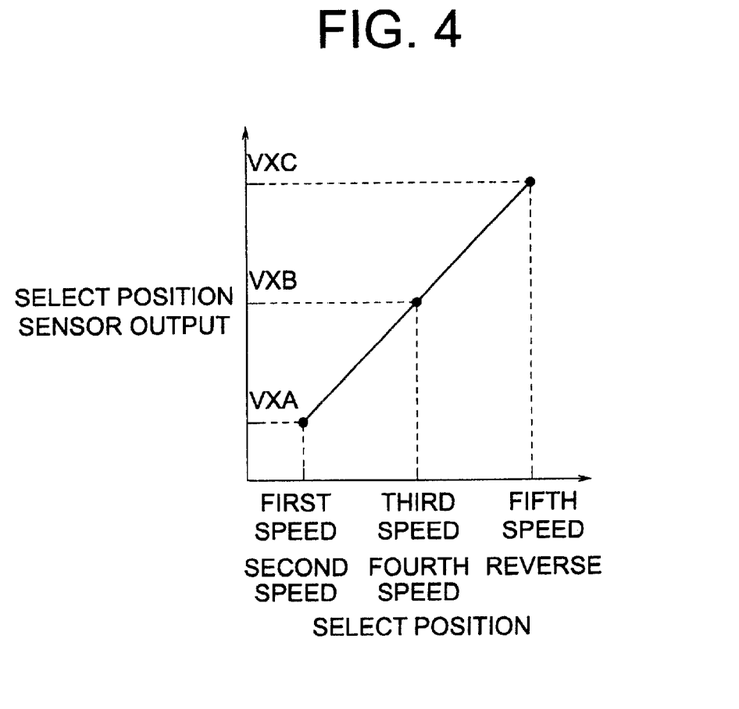
FIG. 4 is a characteristic view showing a relationship between the select position and the select position sensor output in accordance with the embodiment 1 of the invention.

FIG. 4 shows the relationship between the above-described select position and the output of the select positional sensor 62, in which the values representative of the select position voltage learning for the first and second speeds are designated by VXA, the values representative of the select position voltage learning for the third and fourth speeds (including the neutral position) are designated by VXB and the values representative of the select position voltage learning for the fifth speed and the reverse mode are represented by VXC.

The operation will now be described with reference to FIGS. 5 to 7.

Figure 5:
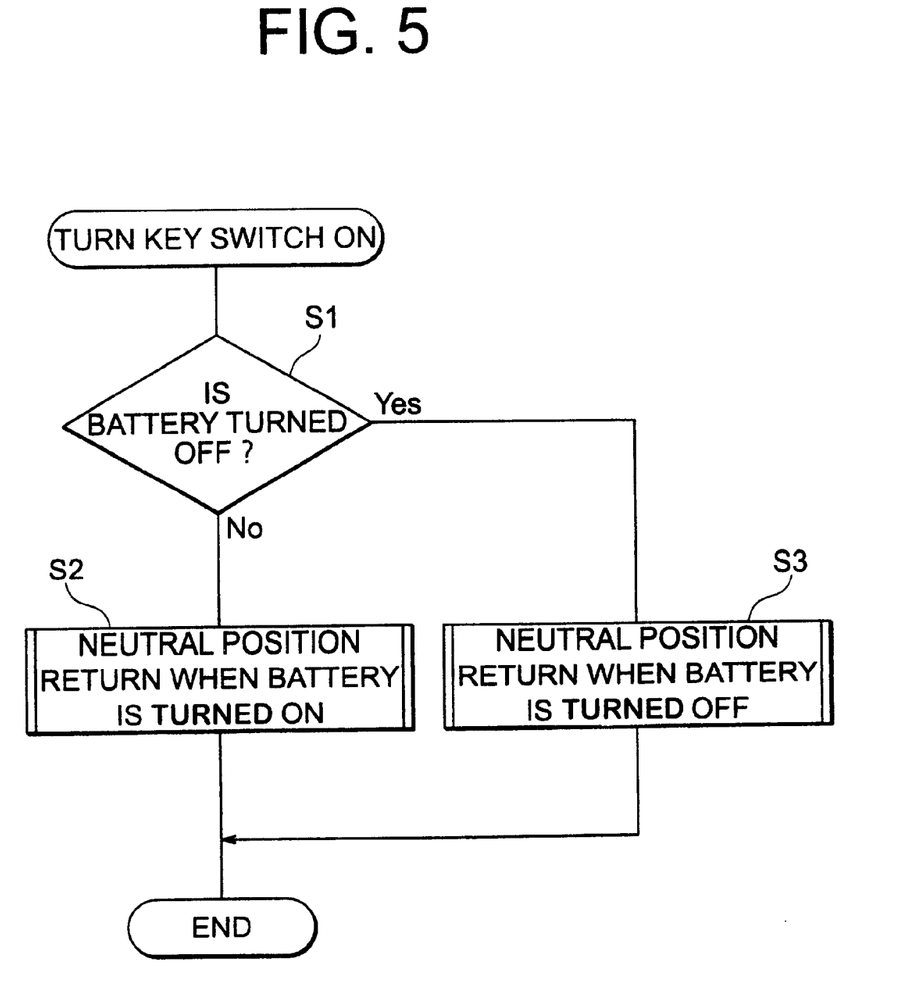
FIG. 5 is a flowchart illustrating the neutral position return process when the key switch is turned on in accordance with the embodiment 1 of the invention.

Referring first to FIG. 5, the operation of the return to the neutral position when the ignition key switch is turned on will be described.

When the key switch is turned on, by a RAM value in the control unit 4, it is judged whether or not the battery has been removed (step S1). If NO, the program goes to the neutral position return process when the battery is turned on (step S2), and if YES, the program goes to the neutral position return process when the battery is turned off (step S3).

Figure 6:
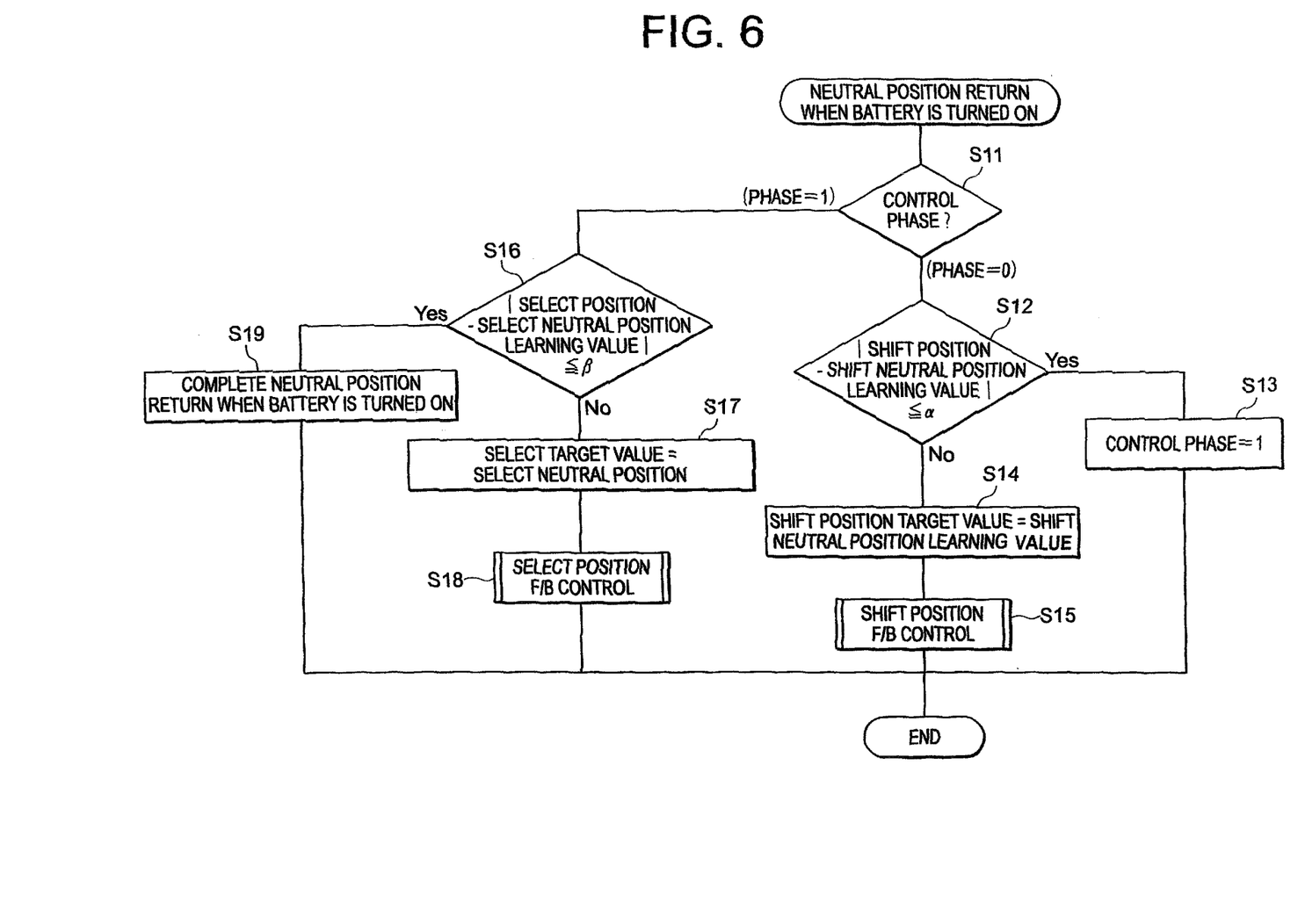
FIG. 6 is a flowchart illustrating the neutral position return process when the battery is turned on in accordance with the embodiment 1 of the invention.
Figure 7:
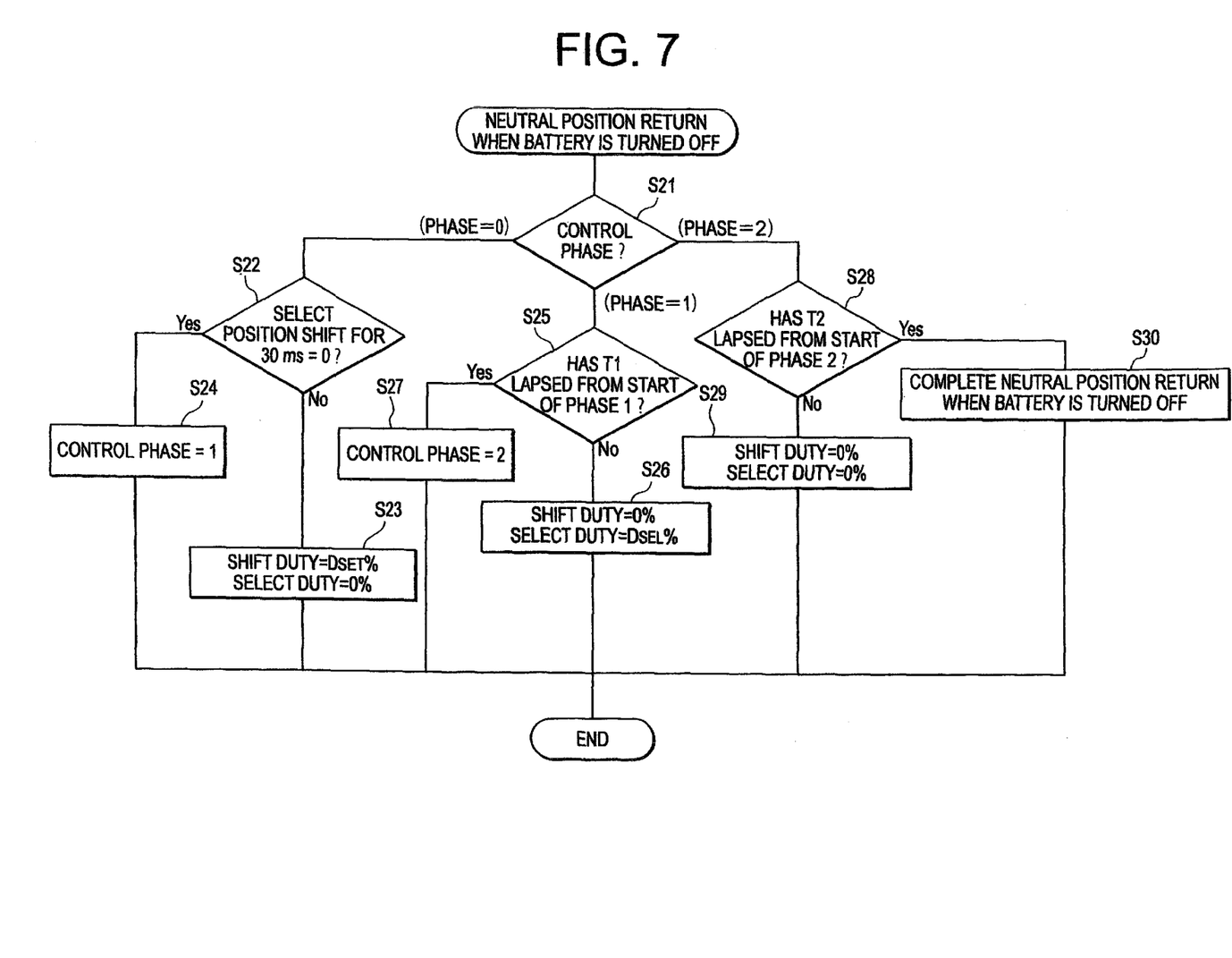
FIG. 7 is a flowchart illustrating the neutral position return process when the battery is turned off in accordance with the embodiment 1 of the invention.

Referring next to FIG. 6, the neutral position return process when the battery of the synchronous engagement type automatic transmission is turned on will be described.

In step S11, the control phase in the neutral position return process when the battery is turned on is judged and the process is performed in each phase.

In the case where the control phase is zero, the program goes to step S12, it is judged whether shift position–shift neutral position learning value is equal to or less than α. If it is so, the control phase is set to one in step S13. If it exceeds a, the program goes to step S14, and the shift positional target value is set to the shift neutral position learning value to thereby perform the shift position feedback control (hereinafter referred to as F/B control) in step S15.

Here, α is a predetermined voltage value (for example, 0.1 V) preset for the purpose of judging the shift neutral position.

On the other hand, in the case where the control phase is one in step S11, the program goes to step S16 and it is judged whether select position—select neutral position learning value is equal to or less than β. If it exceeds β, the program goes to step S17 and the select position target value set to the select neutral position learning value to then perform the select position F/B control in step S18. If the value is equal to or less than β, the program goes to step S19 to complete the neutral control when the battery is turned on.

Here, β is a predetermined voltage value (for example, 0.1 V) preset for the purpose of judging the shift neutral position.

Also, referring to FIG. 7, the neutral position return process when the battery of the synchronous engagement type automatic transmission is turned off will be described.

In step S21, the control phase in the neutral position return process when the battery is turned off is judged and the process is performed in each phase.

In the case where the control phase is zero, the program goes to step S22, it is judged whether the select position shift amount for a predetermined period of, for example, 30 ms is zero. If it is not zero, the shift duty is set to $D_{SFT}$ % (a certain numeric value, for example, 10%) and the select duty is set to zero percent in step S23. Then, the shift motor 51 and the select motor 52 are operated in an open loop control. If it is zero, the control phase is set to one in step S24.

On the other hand, in the case where the control phase is one in step S21, the program goes to the step S25, and it is judged whether time T1 (for example, one second) has lapsed from the start of the control phase 1. If the time T1 has not yet lapsed, the program goes to step S26, and the shift duty=0% and the select duty=$_{SEL}$ % (a certain numeric value, for example, 20%) are set. Then, the shift motor 51 and the select motor. 52 are operated under the open loop control. If the time T1 has lapsed, the control phase=2 is set in step S27.

Also, in the case where the control phase is two in step S21, the program goes to the step S28, and it is judged whether time T2 (for example, one second) has lapsed from the start of the control phase 2. If the time T2 has not yet lapsed, the program goes to step S29, and the shift duty=0% and the select duty=0% are set. Then, the shift motor 51 and the select motor 52 are operated under the open loop control. If the time T2 has lapsed, the neutral position return control when the battery is turned off is completed in step S30.

Thus, in this embodiment, the shift/select positions are returned back to the neutral position in the case where the shift/select positions are not in the neutral position when the key switch is turned on. Therefore, even if the key switch is turned on under the condition that the gear is shifted after the key switch has been turned off in the drive range, the shift/select positions are returned to the neutral position so that the vehicle never moves forward or backward upon the start of the engine.

Also, since the neutral position return operation is performed before the shift neutral position learning and the shift completion position learning which are conducted upon turn-on of the key switch after the battery has been removed, it is possible to normally perform the shift neutral position learning and the shift completion position learning, thereby enhancing the accuracy of the learning operation.

Furthermore, since the neutral position return is performed while the engine is stalled (for example, after the N-D shift), the vehicle never moves forward or backward when the key switch is turned on to start the engine after the engine has once been stalled in the drive range subsequent to the N-D shift.

Embodiment 2

In this embodiment, the neutral position return control start judgment for a synchronous engagement type automatic transmission is effected in the case where the shift/select positions are not in the neutral position when the key switch is turned on in accordance with the embodiment one and, furthermore, the neutral position return control is executed while the key switch is turned off.

Incidentally, the basic control operation during the neutral position return control is the same as that of the embodiment 1 and therefore the explanation therefor is omitted.

Thus, in this embodiment, the neutral position return is performed while the ignition key switch is turned off. Therefore, the vehicle never moves forward or backward even if the key switch is turned on to start the engine under such a condition that the gear is shifted after the key switch has been turned off in the drive range.

What is claimed is:

1. A controlling apparatus for a synchronous engagement type automatic transmission that automatically shifts plural gear stages of the transmission, said controlling apparatus comprising:

a shift/select actuator for shifting the gear stages;

first detecting means for detecting a shift position of the automatic transmission;

second detecting means for detecting a select position of the automatic transmission;

third detecting means for detecting an rpm of an engine; and control means for controlling said shift/select actuator on the basis of detection outputs of said first to third detecting means, wherein, if the shift position and the select position are not in a neutral position when a key switch is turned on, said shift/select actuator is controlled by said control means to return the shift position and the select position to the neutral position.

2. The controlling apparatus for a synchronous engagement type automatic transmission according to claim 1, further comprising:

learning means for learning at least one shift position after a battery power of the engine has been interrupted, wherein, upon turn-on of the key switch, the controlling of said shift/select actuator to return the shift position and the select position to the neutral position is performed before a shift neutral position learning and a shift completion position learning are performed by said learning means.

3. A controlling apparatus for a synchronous engagement type automatic transmission that automatically shifts plural gear stages of the transmission, said controlling apparatus comprising:

a shift/select actuator for shifting the gear stages;

first detecting means for detecting a shift position of the automatic transmission;

second detecting means for detecting a select position of the automatic transmission;

third detecting means for detecting an rpm of an engine; and control means for controlling said shift/select actuator on the basis of detection outputs of said first to third detecting means, said control means controlling said shift/select actuator to return the shift position and the select position to the neutral position when the engine is stalled.

4. A controlling apparatus for a synchronous engagement type automatic transmission that automatically shifts plural gear stages of the transmission, said controlling apparatus comprising:

a shift/select actuator for shifting the gear stages;

first detecting means for detecting a shift position of the automatic transmission;

second detecting means for detecting a select position of the automatic transmission;

a key switch that switches electrical power to operate a vehicle containing the transmission; and control means for controlling said shift/select actuator on the basis of detection outputs of said first and second detecting means in order to return the shift position and the select position to a neutral position while said key switch is turned off.

5. A controlling apparatus for a synchronous engagement type automatic transmission that automatically shifts plural gear stages of the transmission, said controlling apparatus comprising:

a shift/select actuator for shifting the gear stages;

a shift position sensor operative to detect a shift position of the automatic transmission and output detected shift position information;

a select position sensor operative to detect a select position of the automatic transmission and output detected select position information;

an engine revolutions per minute (rpm) sensor operative to detect an rpm of an engine and output detected engine rpm information; and a controller operative to control said shift/select actuator on the basis of the detected shift position information, the detected select position information, and the detected engine rpm information, wherein, if the shift position and the select position are not in the neutral position when a key switch of the engine is turned on, said shift/select actuator is controlled by said controller to return the shift position and the select position to the neutral position.

6. The controlling apparatus for a synchronous engagement type automatic transmission according to claim 5, wherein the controller is operative to learn at least one shift position after a battery power of the engine has been interrupted, and wherein, upon turn-on of the key switch, the controlling of said shift/select actuator to return the shift position and the select position to the neutral position is performed before a shift neutral position learning and a shift completion position learning are performed by said controller.

7. A controlling apparatus for a synchronous engagement type automatic transmission that automatically shifts plural gear stages of the transmission, said controlling apparatus comprising:

a shift/select actuator for shifting the gear stages;

a shift position sensor operative to detect a shift position of the automatic transmission and output detected shift position information;

a select position sensor operative to detect a select position of the automatic transmission and output detected select position information;

an engine revolutions per minute (rpm) sensor operative to detect an rpm of an engine and output detected engine rpm information; and a controller operative to control said shift/select actuator on the basis of the detected shift position information, the detected select position information, and the detected engine rpm information, wherein the controller controls said shift/select actuator to effect a returning of the shift position and the select position to a neutral position when the engine is stalled in a state where the shift position and the select position are not in the neutral position.

8. A controlling apparatus for a synchronous engagement type automatic transmission that automatically shifts plural gear stages of the transmission, said controlling apparatus comprising:

a shift/select actuator for shifting the gear stages;

a shift position sensor operative to detect a shift position of the automatic transmission and output detected shift position information;

a select position sensor operative to detect a select position of the automatic transmission and output detected select position information;

a key switch that switches electrical power to operate a vehicle containing the transmission; and a controller operative to control said shift/select actuator on the basis of the detected shift position information and the detected select position information, in order to return the shift position and the select position to a neutral position while said key switch is turned off.

* * * * *